(12) United States Patent
Williams et al.

(10) Patent No.: US 7,600,392 B2
(45) Date of Patent: Oct. 13, 2009

(54) REFRIGERATION SYSTEM

(75) Inventors: Theodore David Williams, Malanda (AU); Peter Kenneth Courtenay, Malanda (AU)

(73) Assignee: ERA (Environmental Refrigeration Alternatives) Pty Ltd, Queensland (AU)

( * ) Notice: Subject to any disclaimer, the term of this patent is extended or adjusted under 35 U.S.C. 154(b) by 217 days.

(21) Appl. No.: 11/571,663

(22) PCT Filed: Jul. 22, 2005

(86) PCT No.: PCT/AU2005/001082

§ 371 (c)(1),
(2), (4) Date: Mar. 21, 2007

(87) PCT Pub. No.: WO2006/007663

PCT Pub. Date: Jan. 26, 2006

(65) Prior Publication Data

US 2008/0092559 A1    Apr. 24, 2008

(30) Foreign Application Priority Data

Jul. 22, 2004    (AU) .............................. 2004904038

(51) Int. Cl.
*F25D 11/00* (2006.01)
(52) U.S. Cl. ........................................... 62/430; 62/59
(58) Field of Classification Search .................. 62/430, 62/59, 333
See application file for complete search history.

(56) References Cited

U.S. PATENT DOCUMENTS

| 3,068,660 A | * | 12/1962 | Anderson et al. | ............. | 62/139 |
|---|---|---|---|---|---|
| 4,637,219 A | * | 1/1987 | Grose | ........................... | 62/199 |
| 4,735,064 A | | 4/1988 | Fischer | | |
| 4,800,729 A | | 1/1989 | Hara | | |
| 5,029,450 A | | 7/1991 | Takano et al. | | |
| 5,682,752 A | * | 11/1997 | Dean | .............................. | 62/59 |
| 7,421,846 B2 | * | 9/2008 | Narayanamurthy et al. | .... | 62/59 |
| 2002/0007637 A1 | | 1/2002 | Simmons et al. | | |
| 2004/0159118 A1 | | 8/2004 | Hu | | |
| 2004/0159119 A1 | | 8/2004 | Hu | | |

FOREIGN PATENT DOCUMENTS

| DE | 19907250 | 8/2000 |
|---|---|---|
| GB | 2180049 | 3/1987 |
| WO | 8503603 | 8/1985 |
| WO | 9835193 | 8/1998 |

* cited by examiner

*Primary Examiner*—Melvin Jones
(74) *Attorney, Agent, or Firm*—Dennison, Schultz & Macdonald

(57) ABSTRACT

A refrigeration system for merchandisers, drug cabinets and similar enclosures (10) that continues to provide temperature control during periods when external power is not necessarily available. The system typically has a compressor/condenser subsystem (11) that is powered by mains electricity (16) and a second subsystem (12) that includes an insulated eutectic tank. The compressor/condensor (11) cools the tank (12) using external electrical power, when available, while the tank cools the enclosure (10) without requiring external power. A refrigerant loop (14) between the second subsystem (12) and the enclosure (10) operates by way of convection and/or gravity and a simple controller (15).

11 Claims, 5 Drawing Sheets

REFRIGERATION SYSTEM

FIELD OF THE INVENTION

This invention relates to refrigeration systems for enclosed spaces and in particular but not only to a eutectic system that continues to provide temperature control over an enclosed space during periods when external power is not necessarily available.

BACKGROUND TO THE INVENTION

Many refrigeration systems are required to provide cooling without necessarily having access to a continuous supply of electricity. In some cases electrical power is not available for large parts of the day in remote areas or for mobile systems. In others, the systems are required to avoid consumption of power during peak periods. Conventional eutectic systems have been developed to operate under these circumstances, but do not provide adequate temperature control for many purposes. Solar power systems with storage batteries have been developed but are relatively expensive and cannot guarantee that electricity will be available.

SUMMARY OF THE INVENTION

It is an object of the invention to provide a refrigeration system using a eutectic subsystem with temperature control that can operate without external power for useful periods of time, or at least to provide an alternative to existing systems.

In one aspect the invention is a refrigeration system for an enclosure, including: a first cooling subsystem that is powered by an external source, a second cooling subsystem that is not necessarily powered by an external source, a first thermal pathway by which the first cooling subsystem, when powered, cools the second cooling subsystem, a second thermal pathway by which the second cooling subsystem cools the enclosure, and a controller in the second thermal pathway that operates to maintain the enclosure at a predetermined temperature.

Preferably the second thermal pathway is a refrigerant loop that conveys heat from the enclosure to the second cooling subsystem by convection. Refrigerant in the loop circulates by evaporation from a relatively low location to a relatively high location in the enclosure, followed by condensation and descent under gravity within the second subsystem. Preferably the controller includes a valve that regulates the flow of refrigerant around the loop without need of power from an external source.

Preferably the first cooling subsystem includes a compressor/condenser arrangement that is powered by mains electricity and the second cooling subsystem includes an insulated eutectic tank. In one embodiment the first thermal pathway includes a refrigerant loop between the first cooling subsystem and the second cooling subsystem, separate from the second thermal pathway. In another embodiment the first and second pathways are combined, so that the first cooling subsystem, when powered, cools both the second cooling subsystem and the enclosure.

In another aspect the invention is a method of cooling an enclosure, including: operating a powered cooling system to extract heat from a non-powered cooling system, and cooling the enclosure by convective transfer of heat from the enclosure to the non-powered cooling system.

Preferably the method further includes ceasing operation of the powered cooling system during periods when power is not available, and continuing to cool the enclosure during such periods by convective transfer of heat from the enclosure to the non-powered cooling system. Transfer of heat from the enclosure to the non-powered system is controlled to maintain the enclosure at a predetermined temperature.

The enclosure may be a merchandiser, a cold storage room, a cabinet for medical supplies, a transportable container or an air conditioned room, for example.

LIST OF FIGURES

Preferred embodiments of the invention will be described with respect to the accompanying drawings, of which:

FIGS. 1A and 2B schematically show alternative refrigeration systems,

FIGS. 2A and 2B schematically show the alternative systems in more detail,

DESCRIPTION OF PREFERRED EMBODIMENTS

Figure 1A:
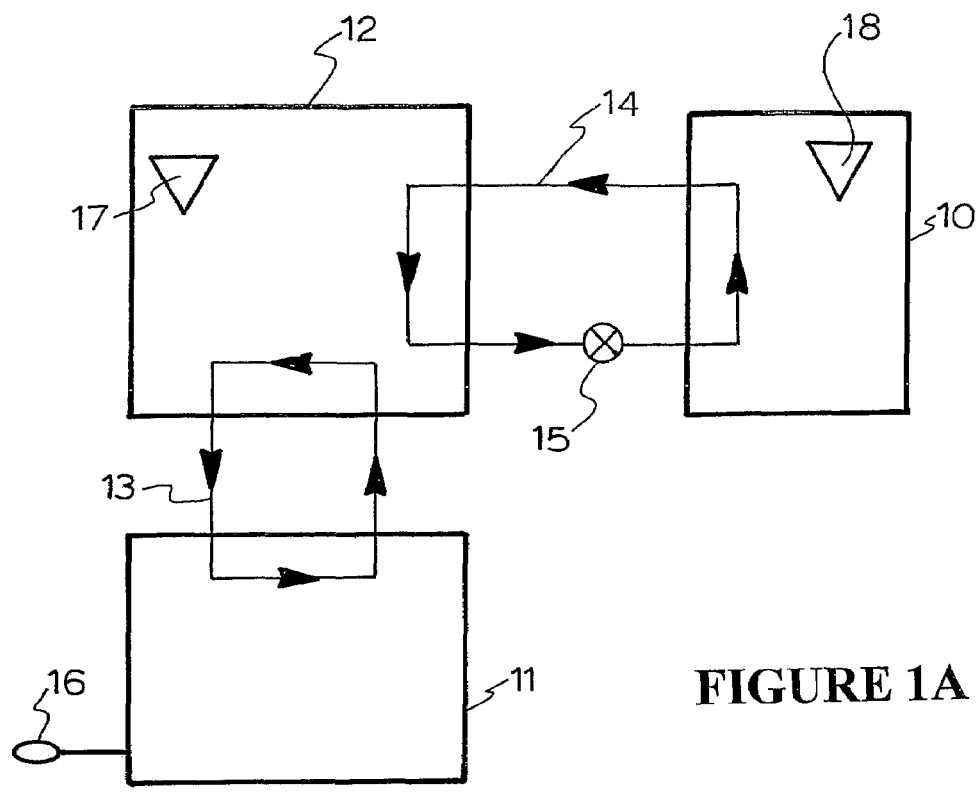

Referring to the drawings it will be appreciated that the invention may be implemented in a range of different ways for a range of different purposes. The systems described here are given by way of example only. It will also be appreciated that many components of these systems are of a conventional nature and need not be described in detail.

Figure 1B:
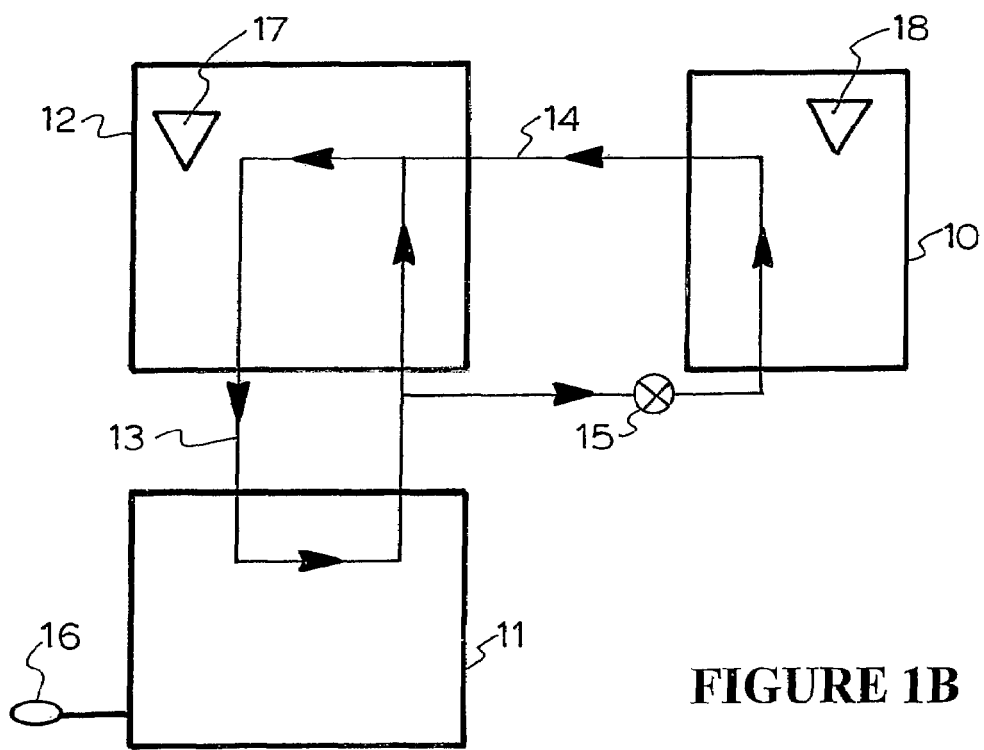

FIGS. 1A and 1B show alternative refrigeration systems, each arranged to cool an enclosure 10. Each system includes a first cooling subsystem 11, typically compressor/condenser equipment that is electrically powered from an external source 16 such as mains electricity, and a second cooling subsystem 12, typically a eutectic device that is generally without an external power supply. A first thermal pathway 13, typically a refrigerant loop, links the first and second cooling subsystems, while a second thermal pathway 14, also typically a refrigerant loop, links the second cooling subsystem with the enclosure. A temperature detector 17 in the second cooling system determines when operation of the first cooling system is required, while a temperature detector 18 in the enclosure determines when operation of the second cooling system is required.

In FIG. 1A the thermal pathways are separate and the first cooling subsystem 11 acts to cool the second cooling subsystem 12 which in turn cools the enclosure. In FIG. 1B the pathways are partially combined so that the first cooling subsystem cools both the second subsystem and the enclosure. In both cases, movement of refrigerant along the first pathway is generally driven by electrical power supplied to the first cooling system, while movement of refrigerant along the second pathway is generally driven by gravity and/or convection without need of external electrical power. A controller 15 such as a solenoid valve is provided in the second thermal pathway to control movement of the refrigerant in response to the detector 18 and thereby control the temperature of the enclosure. Various alternative arrangements of the subsystems and pathways are possible.

Figure 2A:
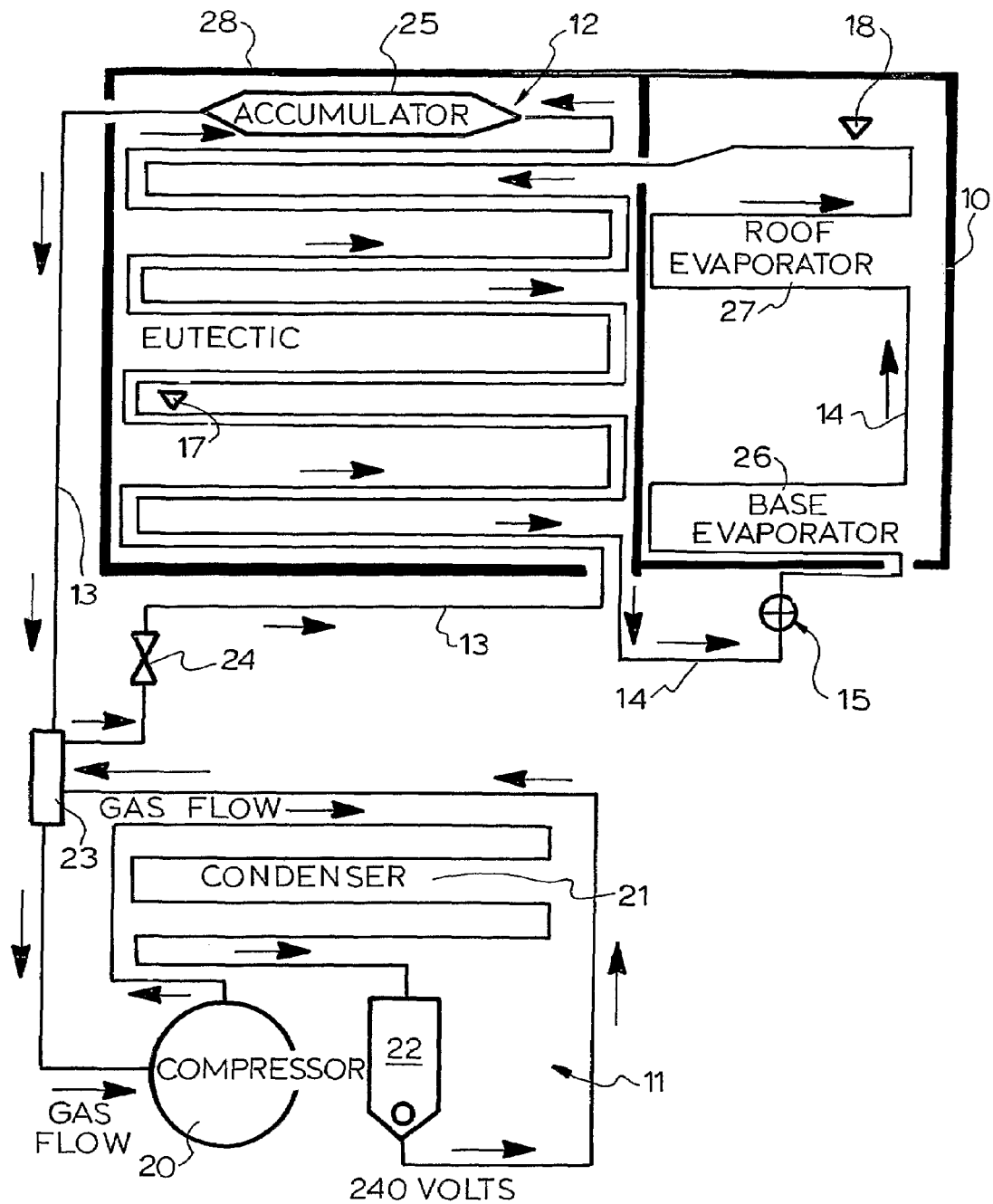

FIG. 2A shows the refrigeration system of FIG. 1A in more detail. The first cooling system 11 includes a compressor 20, a condenser 21, a float 22, a heat exchanger 23 and a capillary brake 24. The second cooling system 12 includes an insulated tank 28 containing a eutectic solution or other material, such as brine or ethylene glycol. The enclosure 10 is a refrigeration cabinet in this example. A refrigerant loop including an accumulator 25 forms the first thermal pathway 13 between the cooling systems, and might be considered as part of the first cooling system. A refrigerant loop forms the second thermal pathway 14 between the second cooling system and the enclosure, and includes one or more evaporators 26 and 27 in the enclosure. The second loop might be considered as part of the second cooling system.

The compressor system 11 in FIG. 2A is able to cool the system 12 when power is available from source 16. Refrigerant in the loop 13 enters the compressor 20 as a relatively cool low pressure gas and is delivered to the condenser 21 as a relatively warm high pressure gas. The condenser dissipates heat from the gas into the atmosphere and produces a warm liquid within the loop. The float 22 and brake 24 are control devices that regulate the flow of liquid along loop 13 from the condenser to the eutectic tank, particularly when the system is started and the tank is relatively warm. The liquid is cooled by expansion through these devices. Once in the tank 28 the liquid refrigerant in loop 13 absorbs heat from the eutectic material by evaporating and then returning to the compressor through the heat exchanger as a gas. The accumulator 25 is a trap that prevents any unevaporated liquid refrigerant from reaching the compressor.

The eutectic system 12 in FIG. 2A cools the enclosure 10 without necessarily using power from an external source or being in direct contact with the enclosure. Refrigerant loop 14 is arranged so that the refrigerant circulates in response to the effects of gravity and convection with the overall rate of flow determined by the controller 15. Refrigerant cools and descends within tank 28 and passes as a liquid from the tank into the enclosure. The refrigerant enters at a relatively low point in the enclosure and depending on the temperature of the enclosure, is either pushed up toward the roof evaporator 27 or begins to evaporate initially in the base evaporator 26. The liquid thereby absorbs heat from the enclosure and returns to the tank 28 as a gas from a relatively high point in the enclosure.

Figure 2B:
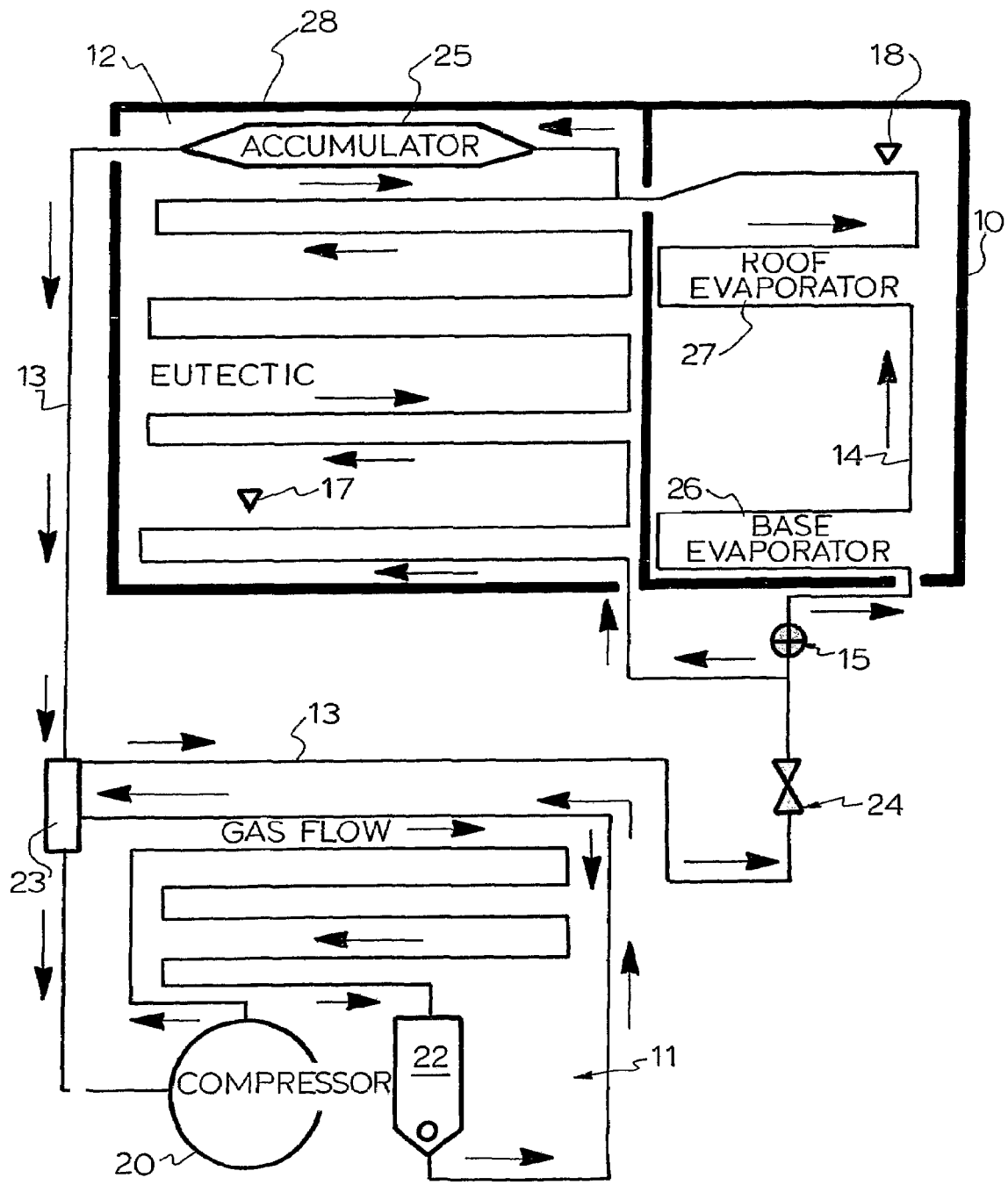

FIG. 2B shows a refrigeration system in which the thermal pathways are combined, as an alternative to the system in FIG. 2A. The compressor subsystem 11 cools either the eutectic subsystem 12 alone, or both the eutectic subsystem and the enclosure, depending on the status of controller 15. The system of FIG. 2B cools the enclosure more quickly under a heavy load but the combined pathways require a common refrigerant and are more difficult to repair in the event of a leak. On the other hand, the system of FIG. 2B allows use of different refrigerants that may be selected for performance of the particular loop.

Figure 3:
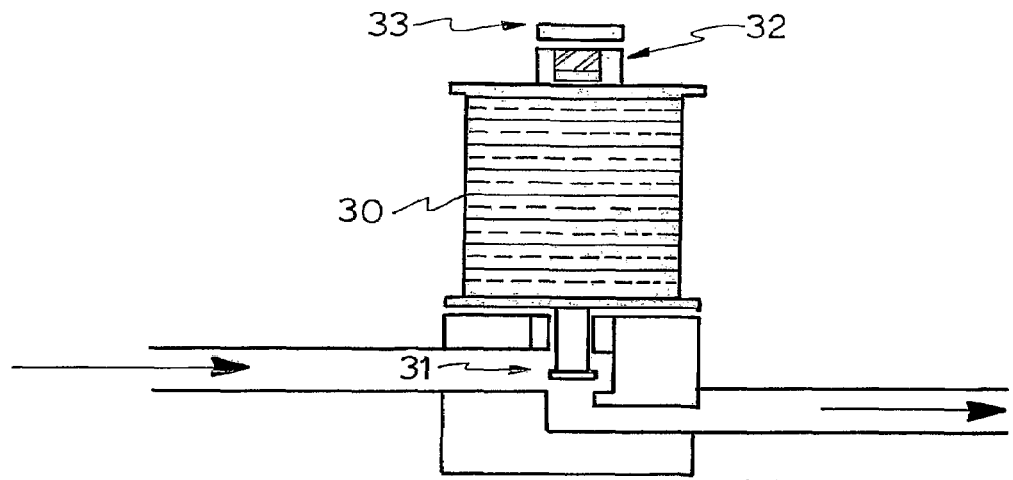
FIG. 3 shows a solenoid device that may be used as a valve in either system.

FIG. 3 shows a solenoid valve 15 in more detail. The valve is operated by a microprocessor (not shown) that monitors the temperature detectors 17 and 18 and draws power from a battery (not shown). A pair of coils 30 are pulsed to open and close the seat 31 of the valve when required by the microprocessor. The valve is normally held in a closed position by a spring 32 and requires no power in that position. Similarly the valve may be held open by a magnet 33 without additional power. An appropriate coil is pulsed to change the open or closed status of the seat requiring minimal power for a short period of time. Other valve systems that operate from temperature differentials and do not require battery power might also be used.

Figure 4:
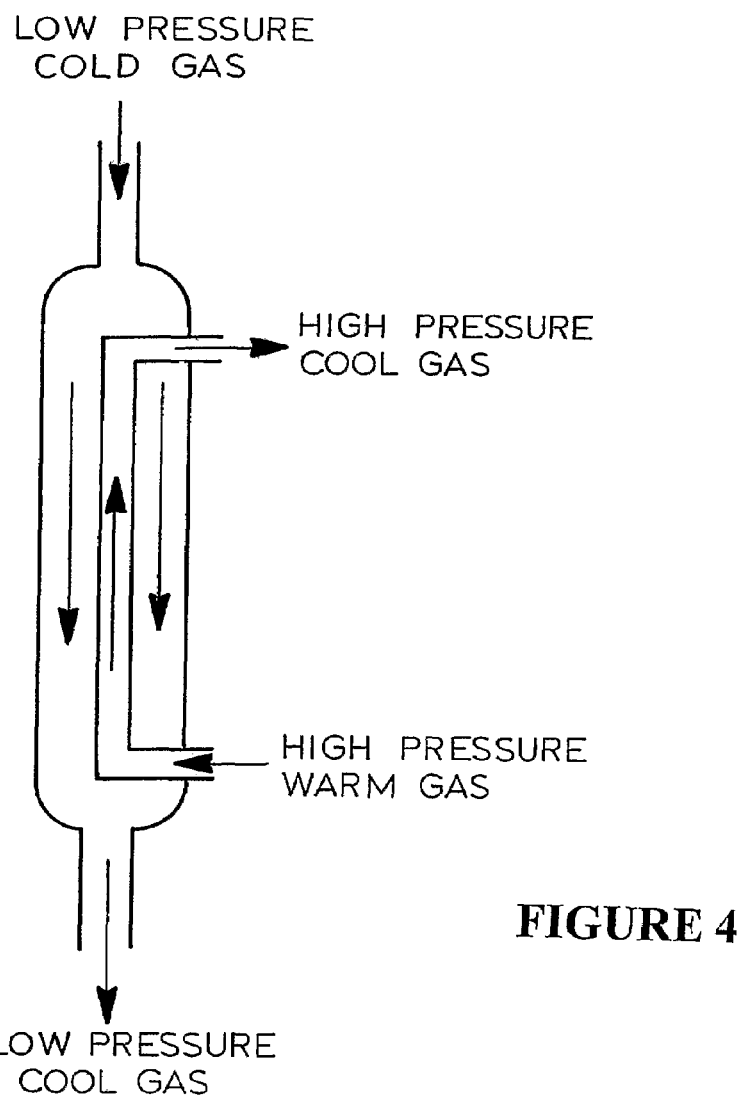
FIG. 4 shows a heat exchanger that may be used in either system.

FIG. 4 shows a heat exchanger 23 of FIGS. 2A and 2B in more detail. Warm liquid refrigerant passing from the condenser 21 through the high side float 22 reaches the heat exchanger as a cool liquid with some vapour. Relatively cold vapour from the eutectic tank also passes through the heat exchanger when moving back to the compressor 20. The cold vapour from the tank sub-cools the liquid and vapour from the float to form a cool liquid without vapour moving towards the capillary brake 24. The level of heat exchange between the inflowing and outflowing liquids and vapours is determined to enhance the efficiency of the compressor.

Figures 5A, 5B, 5C:
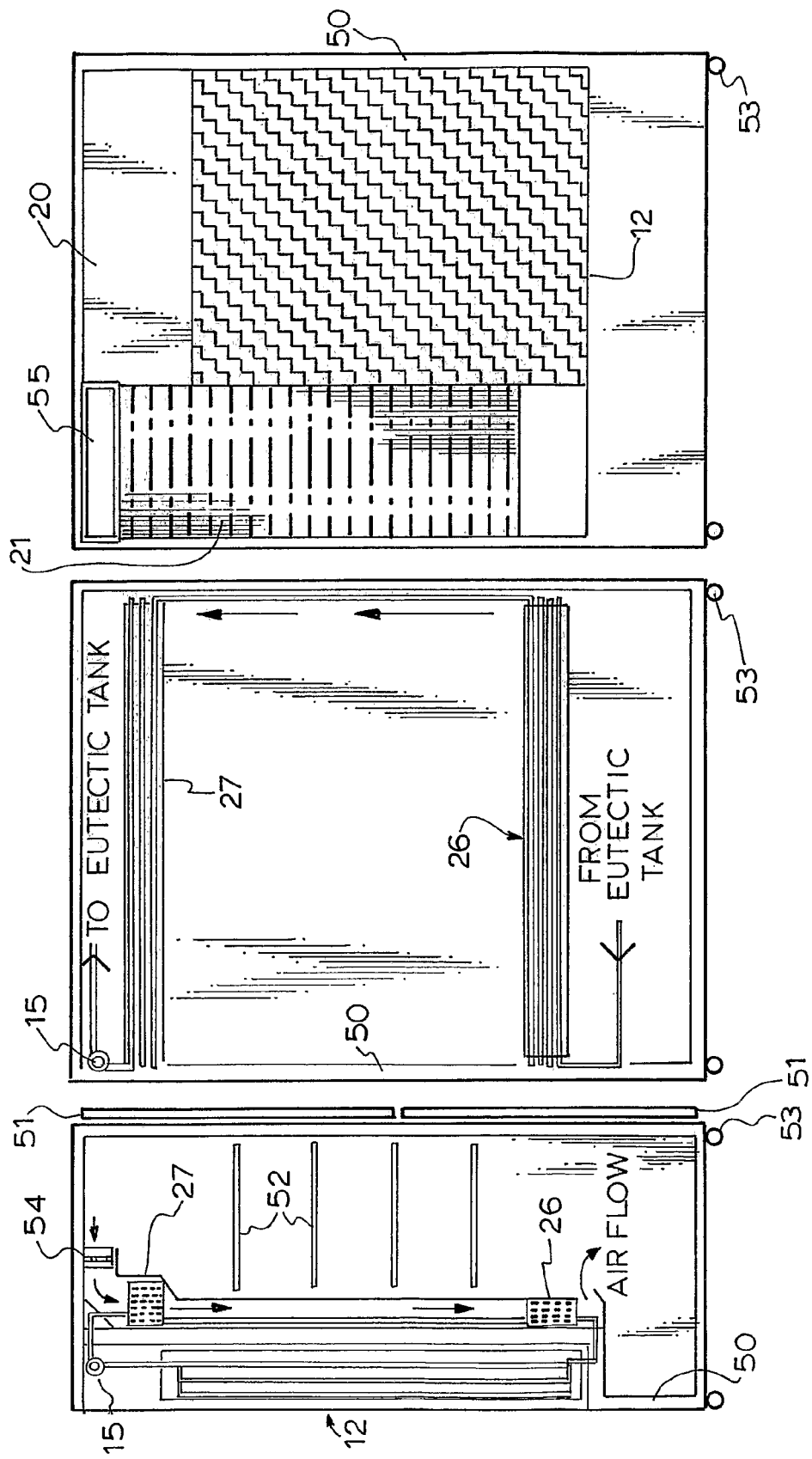
FIGS. 5a, 5b, 5c are views of a merchandiser with a refrigeration system.

FIGS. 5a, 5b and 5c are sectional views of a merchandiser that incorporates a refrigeration system as shown in FIG. 2A or 2B. The merchandiser includes a cabinet 50 with front doors 51, shelves 52 for products such as food or drink, and may be mounted on wheels 53. Refrigerant from a eutectic tank 12 located in the rear of the cabinet flows through the base evaporator 26 upwards to the roof evaporator 27, as indicated, and then returns to the tank. Valve 15 between the eutectic tank and the roof evaporator controls the flow of refrigerant. An optional fan 54 in the roof of the cabinet drives air flow downwards through the roof evaporator to the base evaporator, as indicated. The fan is powered by mains electricity and is generally not operated when power is not available.

As shown in FIG. 5c, the compressor 20 is located in an upper part of the rear of the cabinet in this example. The condenser 21 is located on one side at the rear of the cabinet and may have a fan 55 to assist dispersal of heat when power is available. A relatively small compressor can be used because the effect of sudden or heavy loads in the cabinet, such as opening of the front doors and stocking of the shelves, is buffered by heat absorption in the eutectic tank. Operation of the compressor can also be optimised for predetermined time periods with a reduced number of start events.

The invention claimed is:

1. A refrigeration system for an enclosure, including:
   a first cooling subsystem that is powered by an external source,
   a second cooling subsystem that is operable without an external source of electrical power,
   a first thermal pathway by which the first cooling subsystem, when powered, cools the second cooling subsystem,
   a second thermal pathway by which the second cooling subsystem cools the enclosure without requiring power from an external source,
   a controller in the second thermal pathway that operates to maintain the enclosure at a predetermined temperature,
   a temperature detector in the second cooling subsystem for determining when operation of the first cooling subsystem is required.

2. The system of claim 1 wherein the second thermal pathway is a refrigerant loop that conveys heat from the enclosure to the second cooling subsystem by convection.

3. The system of claim 2 wherein refrigerant in the loop circulates by evaporation from a relatively low location to a relatively high location in the enclosure, followed by condensation and descent under gravity within the second subsystem.

4. The system of claim 1 wherein the controller includes a valve that regulates the flow of refrigerant around the second thermal pathway without need of power from an external source.

5. The system of claim 1 wherein the first cooling subsystem includes a compressor/condenser arrangement that is powered by mains electricity and the second cooling subsystem includes an insulated eutectic tank.

6. The system of claim 1 wherein the first thermal pathway includes a refrigerant loop between the first cooling subsystem and the second cooling subsystem, separate from the second thermal pathway.

7. The system of claim 1 wherein the first and second pathways are partially combined, so that the first cooling subsystem, when powered, cools both the second cooling subsystem and the enclosure.

8. A method of cooling an enclosure, including:
operating a powered cooling system to extract heat from a non-powered cooling system upon determination by a temperature detector in the non-powered cooling system that said operating is required,
cooling the enclosure by convective transfer of heat from the enclosure to the non-powered cooling system, and
controlling the transfer of heat by stopping the convective transfer when required to maintain the enclosure at a predetermined temperature.

9. The method of claim 8 further including:
ceasing operation of the powered cooling system during periods when electrical power is not available, and
continuing to cool the enclosure during such periods by convective transfer of heat from the enclosure to the non-powered cooling system.

10. The method of claim 8 wherein the enclosure is selected from the group consisting of a merchandiser, a cold storage room, a cabinet for medical supplies, a transportable container and an air conditioned room.

11. The method of claim 8 wherein the transfer of heat from the enclosure occurs through a refrigerant loop in which refrigerant circulates by evaporation from a relatively low location in the controller to a relatively higher location in the enclosure, followed by condensation and descent under gravity within the non-powered cooling system.

* * * * *